(12) United States Patent
Liphardt

(10) Patent No.: US 12,498,317 B1
(45) Date of Patent: Dec. 16, 2025

(54) SAMPLE ALIGNMENT SYSTEM IN REFLECTOMETERS, ELLIPSOMETERS, SPECTROPHOTOMETERS AND THE LIKE

(71) Applicant: Martin M. Liphardt, Lincoln, NE (US)

(72) Inventor: Martin M. Liphardt, Lincoln, NE (US)

(73) Assignee: J.A. WOOLLAM CO., INC., Lincoln, NE (US)

( * ) Notice: Subject to any disclaimer, the term of this patent is extended or adjusted under 35 U.S.C. 154(b) by 105 days.

(21) Appl. No.: 18/445,912

(22) Filed: Mar. 23, 2024

Related U.S. Application Data

(60) Provisional application No. 63/455,092, filed on Mar. 28, 2023.

(51) Int. Cl.
| | |
|---|---|
| *G01N 21/31* | (2006.01) |
| *G01B 11/27* | (2006.01) |
| *G01N 21/21* | (2006.01) |
| *G01N 21/55* | (2014.01) |

(52) U.S. Cl.
CPC ............ *G01N 21/31* (2013.01); *G01B 11/272* (2013.01); *G01N 21/211* (2013.01); *G01N 21/55* (2013.01); *G01N 2201/061* (2013.01); *G01N 2201/068* (2013.01)

(58) Field of Classification Search
CPC ...... G01N 21/31; G01N 21/211; G01N 21/55; G01N 2201/061; G01N 2201/068; G01B 11/272

See application file for complete search history.

(56) References Cited

U.S. PATENT DOCUMENTS

| | | |
|---|---|---|
| 7,317,530 B2 | 1/2008 | Liphardt et al. |
| 7,746,471 B1 | 6/2010 | Johs et al. |
| 8,064,055 B2 | 11/2011 | Liphardt et al. |
| 8,248,606 B1 | 8/2012 | Liphardt et al. |
| 8,436,994 B2 | 5/2013 | Liphardt et al. |
| 8,638,437 B2 | 1/2014 | Liphardt et al. |
| 8,749,782 B1 | 6/2014 | Liphardt et al. |
| 8,749,785 B2 | 6/2014 | Liphardt |
| 10,209,528 B1 | 2/2019 | Liphardt |
| 2005/0006590 A1 * | 1/2005 | Harrison ............... G01J 3/0208 250/372 |
| 2022/0035104 A1 * | 2/2022 | Filion ................. G02B 21/0008 |
| 2022/0074848 A1 * | 3/2022 | Jung ................... G01N 21/9501 |
| 2023/0152213 A1 * | 5/2023 | Hidaka ............... G01N 21/9501 356/365 |

FOREIGN PATENT DOCUMENTS

| | | | | |
|---|---|---|---|---|
| WO | WO-0218914 A1 * | 3/2002 | ........... | G01N 21/211 |

\* cited by examiner

*Primary Examiner* — Hina F Ayub
(74) *Attorney, Agent, or Firm* — James D. Welch

(57) ABSTRACT

Sample surface alignment systems and methodology particularly applicable where samples are investigated in environmental chambers.

12 Claims, 4 Drawing Sheets

SAMPLE ALIGNMENT SYSTEM IN REFLECTOMETERS, ELLIPSOMETERS, SPECTROPHOTOMETERS AND THE LIKE

TECHNICAL FIELD

The present invention relates to reflectometer, ellipsometer spectrophotometer and the like systems, and more particularly to sample alignment systems and methodology applicable thereto, with particularly relevant application where samples are investigated in environmental chambers.

BACKGROUND

It is well known to investigate samples with electromagnetic radiation which approaches at an oblique angle to the surface thereof. A requirement for obtaining data, however, is that the sample surface be properly aligned. This includes positioning a sample so that a beam reflecting from its surface enters a data detector. That is, a sample surface can be positioned too "high" or too "low" so that a beam reflecting from its surface does not enter a system Sample Alignment Detector, wherein "high" and "low" refer to opposite directions along a perpendicular to a sample surface. It can be very time consuming to have to guess if the Sample is too "high" or too. "low" and then adjust the Sample position randomly. The Present Invention recognizes this and provides a system and method for properly positioning a Sample Surface supported on a stage so that a beam reflecting therefrom is positioned to enter a data detector of the reflectometer, ellipsometer or spectrophotometer of which it is a part. While in many settings sample surface positioning presents only a minimal problem, when a sample is present in an environmental chamber it can be especially difficult to judge the location of a sample surface, and glean information as to if the sample needs to be "raised" or "lowered" to meet alignment criteria.

Known Patents which are related include:
Patent to Liphardt, U.S. Pat. No. 10,209,528;
Patent to Liphardt et al., U.S. Pat. No. 8,638,437;
Patent to Liphardt et al., U.S. Pat. No. 8,749,782;
Patent to Liphard, U.S. Pat. No. 8,749,785;
Patent to Liphardt et al., U.S. Pat. No. 8,436,994;
Patent to Liphardt, U.S. Pat. No. 8,351,036;
Patent to Liphardt et al., U.S. Pat. No. 8,248,606;
Patent to Liphardt et al., U.S. Pat. No. 8,064,055;
Patent to Johs et al., U.S. Pat. No. 7,746,471; and
Patent to Liphardt et al., U.S. Pat. No. 7,317,530.

Need remains for a Sample Alignment system which enables detecting a signal at a Sample Alignment Detector even when the sample surface is far removed from a desired location. The present invention applies beam relay elements to aid in the alignment task.

DISCLOSURE OF THE INVENTION

The Present Invention is, in a preferred embodiment a reflectometer, ellipsometer or spectrophotometer system comprising:
a) a source of a beam of electromagnetic radiation;
b) a first beam directing reflective element;
c) a source beam focusing element;
d) a stage for supporting a sample having a surface;
e) a collimating element;
f) a second beam directing reflective element;
g) sequentially positioned first and second relay elements;
h) a beam splitter;
i) in a first path following said beam splitter a first detector focusing element and a sample surface position detector;
j) in a second path following said beam splitter a second detector focusing element and a data detector; and
k) a means for adjusting the position of a sample surface on said stage for supporting a sample.

Said reflectometer, ellipsometer or spectrophotometer system being distinguished by the presence of said sequential first and second relay elements.

Said reflectometer, ellipsometer or spectrophotometer system can further comprise an environmental chamber with window regions through which electromagnetic radiation can pass and in which said source of a beam of electromagnetic radiation and said beam splitter with associated detector focusing elements and sample surface position and data detectors are present outside thereof, with all other elements being present therewithin.

A method of aligning a sample surface on a stage for supporting it comprising the steps of:
1) providing a reflectometer, ellipsometer or spectrophotometer system comprising as just described above:
2) placing a sample having a surface on said stage;
3) calibrating the reflectometer, ellipsometer or spectrophotometer system by causing said source of a beam of electromagnetic radiation to direct a beam of electromagnetic radiation so that it is focused by said source beam focusing element onto said sample and reflects therefrom into said collimating element, said beam emerging therefrom, reflecting from said reflecting element and passing through said sequentially positioned first and second relay elements and onto said beam splitter;
4) adjusting the position of said stage so that beam intensity received at the data detector is maximized or substantially so, and noting on said stage positioning detector an indication of that condition;
5) performing a selection from the group consisting of:
removing the sample having a surface from said stage for supporting said sample and placing it, or another sample thereupon; and
placing another sample having a surface upon said stage; and
6) adjusting position of said stage for supporting a sample so that the sample surface position detector indicates the same position as in step 4) and acquiring data from said data detector.

The reflectometer, ellipsometer or spectrophotometer system system can provide that the:
source beam focusing element;
collimating element;
first and second detector focusing elements in the pathways from said beam splitter;
are all Lenses; and
in which the first and second beam directing reflective elements are total internal reflection prisms; and
in which the sequentially positioned first and second relay elements are each multiple element Lenses.

Alternatively, the Present Invention reflectometer, ellipsometer or spectrophotometer system comprises:
a) a source of a beam of electromagnetic radiation;
b) a source beam focusing element;
c) a stage for supporting a sample having a surface;
d) a collimating element;
e) sequentially positioned first and second relay elements;
f) a beam splitter;

g) in a first path following said beam splitter a first focusing element and a sample surface positioning detector;

h) in a second path following said beam splitter a second focusing element and a data detector; and i) a means for adjusting the position of said stage for supporting a sample having a surface.

Said reflectometer, ellipsometer or spectrophotometer system is distinguished by the presence of said sequential first and second relay elements.

Said Present Invention reflectometer, ellipsometer or spectrophotometer can further comprise two beam directing reflective elements, the first thereof being present between said source of a beam of electromagnetic radiation and said source beam focusing element, and the second thereof being present between said collimating element and said sequential first and second relay elements.

The beam directing reflective elements can be total internal reflecting elements such as Prisms.

The reflectometer, ellipsometer or spectrophotometer system can further comprise an environmental chamber comprising window regions through which a beam of electromagnetic radiation from the source thereof can enter and a beam exiting said two sequential relay elements can exit.

The Present Invention will be better understood by reference to the Detailed Description Section of this Specification, in conjunction with the Drawings.

BRIEF DESCRIPTION OF THE DRAWINGS

FIG. 1' shows a non-limiting demonstrative means for adjusting the position of a Sample Surface Position, (eg. (SSP1) (SSP2).

DETAILED DESCRIPTION

In the disclosure in this Section of the Specification it must be kept in mind that the Drawings show the Mid-points in Beams of Electromagnetic radiation for two cases of a Sample Surface (SSP1) and (SSP2) Positioning. This is critical to understanding as, for instance, what looks to be the result of Collimation or Focusing in typical settings (where an entire Beam is shown), can be the result of Focusing or Collimation, respectively. The point to keep in mind is that the Mid-point in a Beam can exit from a Collimating Element in a direction that would appear to be the result of Focusing and a Beam can exit from a Focusing Element in a directing that would appear to be the result of Collimation. This results from the fact that a Central Beam interacts with the location of a Element at which it enters that Elements and only that enter an Element at the Midpoint are undeviated by passing therethrough.

Figure 1:
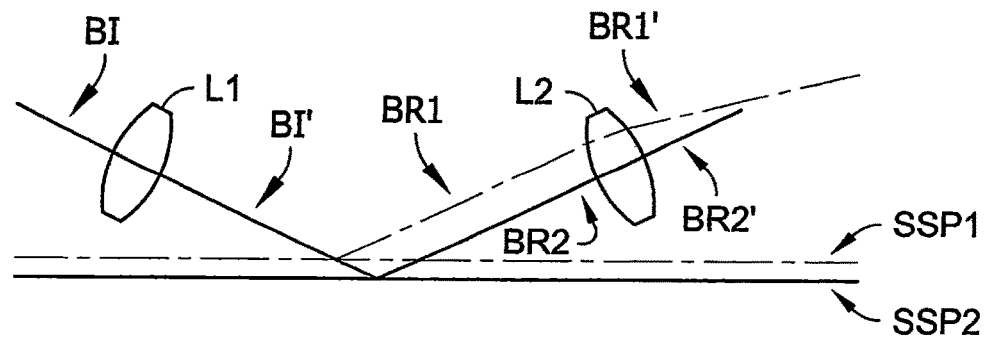
FIG. 1 demonstrates a system for investigating samples showing a Focused Input Beam (IBI') of electromagnetic radiation which is reflected from a sample surface, said sample surface being shown in two positions (SSP1) and (SSP2) along a perpendicular to said surface.
Figure 1:
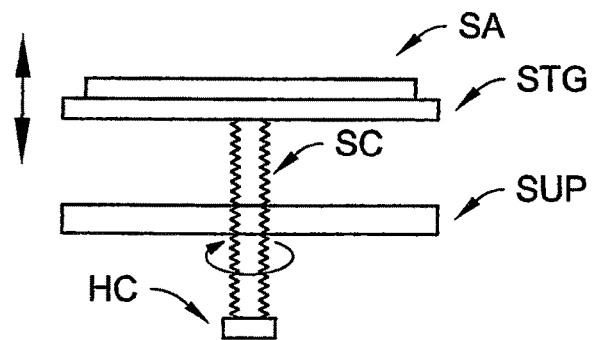
Figure 2:
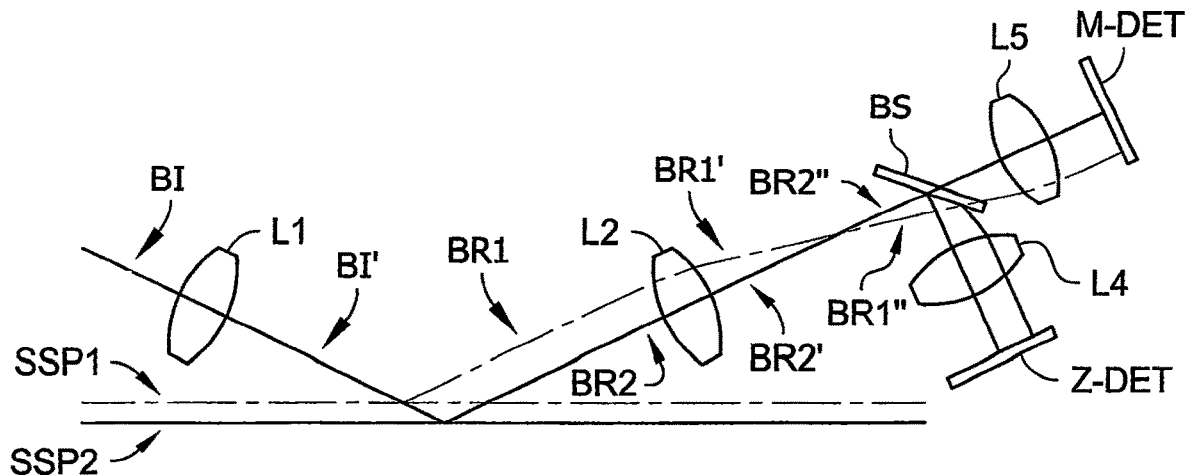
FIG. 2 expands on FIG. 1 and provides an added Beam Splitter (BS) and two Focusing Elements (L4) and (L5) before the Alignment (Z-DET) and Data (D-DET) Detectors, respectively.
Figure 3:
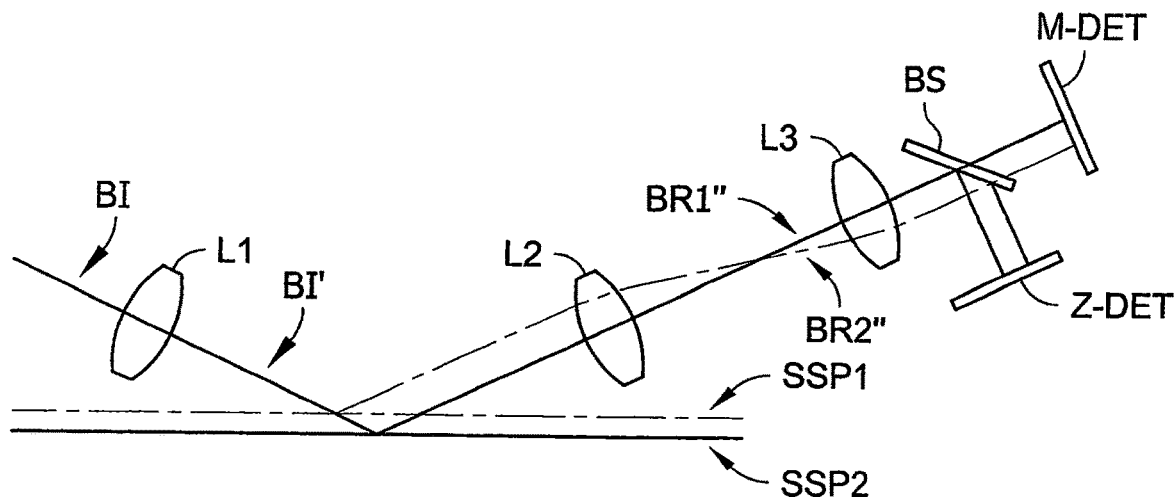
FIG. 3 shows a Focusing Element (L3) and a Beam Splitter (BS) that directs both Beams (BR1") and (BR2") to Alignment (Z-DET) and Data (D-DET) Detectors.

FIGS. 1, 2 and 3 show prior art for measuring the position of a Sample surface in a direction perpendicular to a surface of a sample. FIG. 1 shows an Input Beam of Electromagnetic Radiation (B1) passing through Focusing Element (L1) to emerge as (B1'), and proceeding toward a Sample Surface, shown in two sequential positions (SSP1) and (SSP2). That is, the same Sample Surface is involved in producing both Reflected Beams (BR1) and (BR2), but at different times when said surface is positioned differently. It is critical to understand that the Sample Surface is translated along a direction which is perpendicular to said Surface to provide Beams (BR1) and (BR2) at said different times, (ie. Beams (BR1) and (BR2) are not simultaneously present). Note that Beam (BR2) passes through Focusing Element (L2) at the approximate Center thereof and is not deviated after it exist said Focusing Element (L2), but that Beam (BR1) passes through Focusing Element (L2), having entered at a position removed from the center of Focusing Element (L2) and is Deviated upon its exit therefrom. FIG. 2 adds a Beam Splitter (BS), two Focusing Element (L4) and (L5), and two Detectors, one a Sample Surface position monitoring Detector (Z-DET) and the other a Data Detector (M-DET). FIG. 3 is a modification of FIG. 2 in that the two Focusing Elements (L4) and (L5) are not present, but a Focusing (L3) is present before the Beam Splitter (BS).

FIG. 1' is included to show a non-limiting demonstrative means for adjusting the position of a Sample Surface, (eg. (SSP1) (SSP2) in FIG. 1). In use the Support (SUP) is stable in position, and a Screw (SC) rotated in Screw Threads (TH) in said Support (SUP) leading to a Stage (STG) for Supporting s Sample (SA) to move "Up" or "Down" to (SSP1) or (SSP2) etc. Any functionally equivalent system is to be considered an equivalent means. Element (HC) represents any generic Height Control system.

Figure 4:
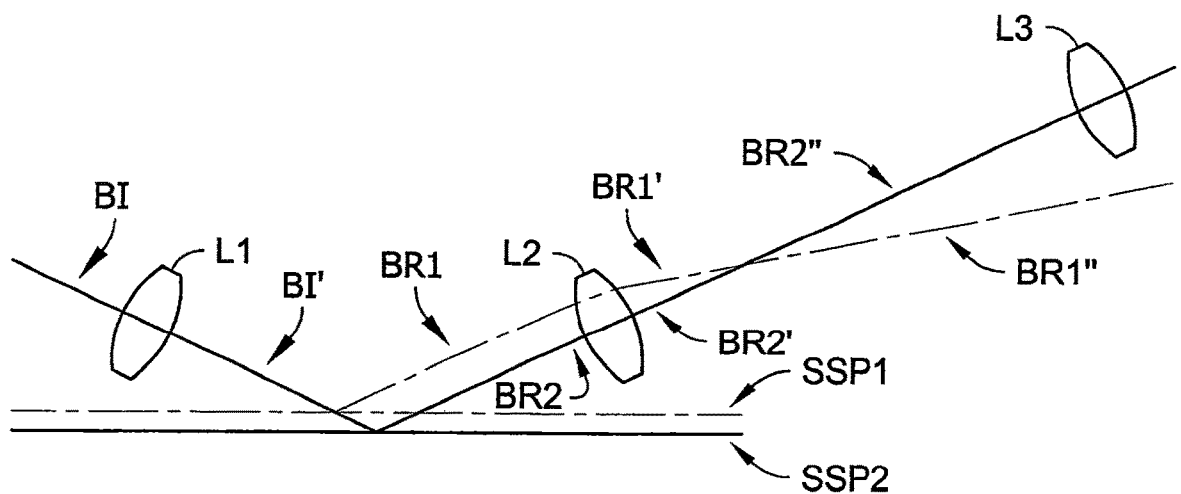
FIG. 4 expands on FIG. 1, showing that it is possible for a sample surface to be positioned so that a Reflected Beam (BR1") is not collected by a Focusing Element (L3), which it would have to be to direct it toward Alignment and Data Detectors (Z-DET) and (D-DET).
Figure 5:
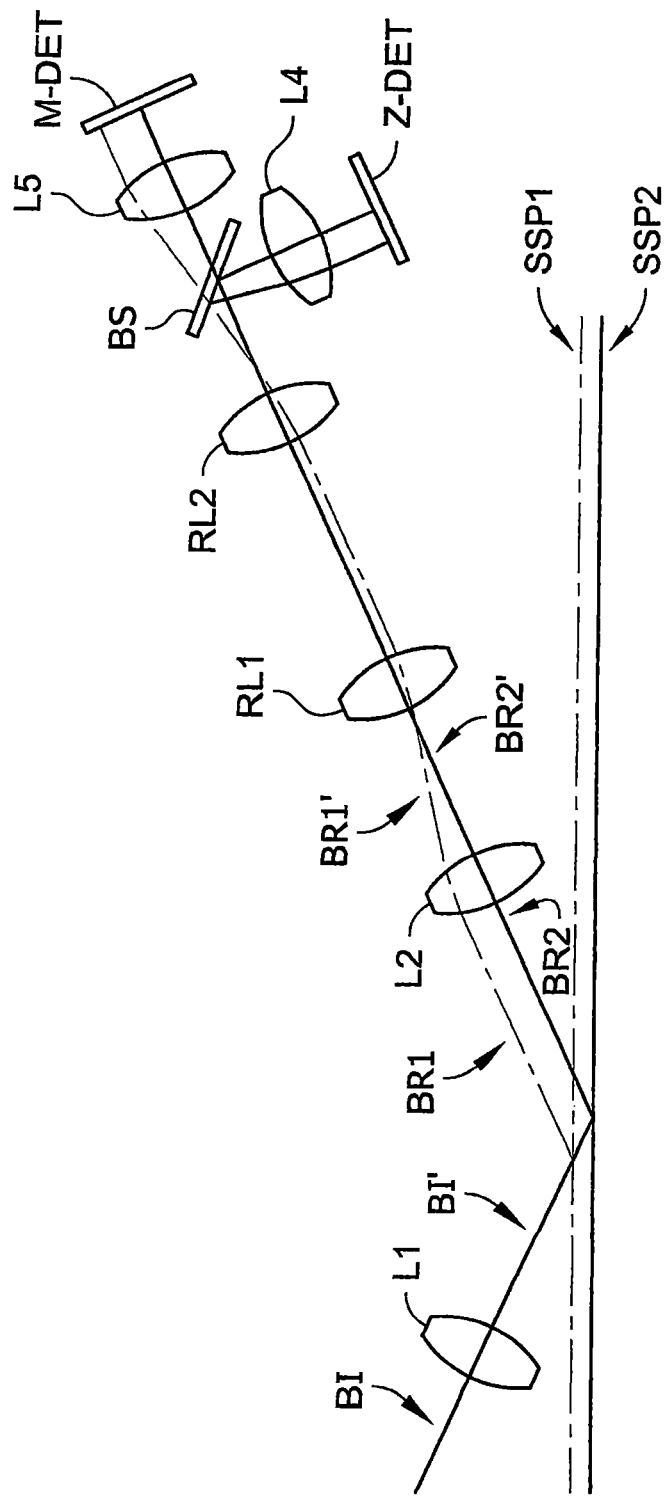
FIG. 5 is much like FIG. 2, but further provides two sequential Relay Elements (RL1) and (RL2).
Figure 6:
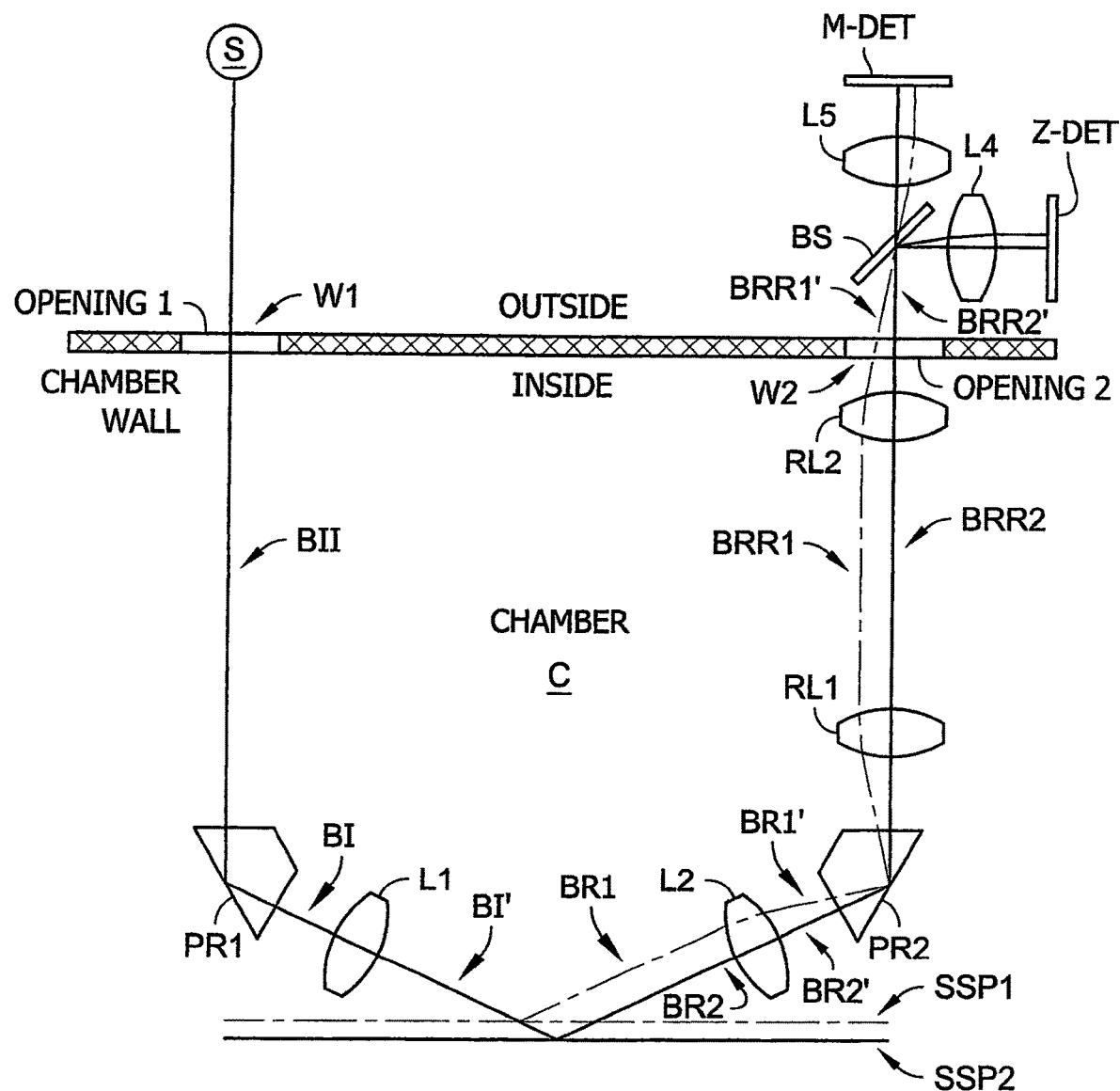
FIG. 6 shows a FIG. 5 type system in a Chamber (C) having Windows (W1) and (W2), and including added Beam Directing Elements (PR1) and (PR2).

FIG. 4 shows that a problem can develop when a Sample Surface (SSP1) is positioned so that a Beam (BR1") is directed toward a Third Element (L3) which is placed to receive a properly Aligned Sample Surface (eg. (SSP2) in FIG. 3) and send it on to an Alignment and a Data Detector (see (Z-DET) and (D-DET) respectively in FIGS. 2 and 3). Note that Reflected Beam. (BR1") completely misses the Collecting Element (L3) as (L3) is located too far from the Sample Surface (SSP1). In practice a user, upon first encountering a situation indicated by the relationship between the position of Element (L3) and Beam (BR1"), will often have no insight as to whether the Sample Surface (SSP1) is too "high" or too "low" and will have to spend time at a trial and error procedure until Beam (BR1") is caused to enter Element (L3) and be passed on to Alignment and Data Detectors (Z-DET) and (D-DET) in FIG. 3. FIG. 4 then shows a graphical representation of the problem the Present Invention solves, that being that Element (L3) is meant to intercept and collect a Beam but is too far away from a Sample Surface to collect the deviated beam and direct it towards Position detector (Z-DET). Element (L3) positioning is often determined by external factors, such as mounting the system onto an existing structure with dimensions that cannot be changed (such as a Chamber (C) in FIG. 6 for example). It's still possible to detect the sample position using Beam (BR2"), but the range is very limited and a user would have to discover that "lowering" the Sample was appropriate by trial and error. The larger the distance between Elements (L2) and (L3) in FIG. 4, the smaller the range of positions (SSP1) and (SSP2) becomes. The Present Invention solves the identified problem by adding Relay Elements (RL1) and (RL2), as shown in FIG. 5 to direct Beams (BR1) (BR2) so that they transverse the extra distance necessitated to arrive at the next Element, which in FIG. 5 is the Beam Splitter (BS), and in FIG. 6 is a Window (W2). Note that an Element (L3) can be placed before the Beam Splitter (BS) as in FIG. 3, and the Present Invention remain within the Scope thereof.

FIGS. 5 and 6 show embodiments of the Present Invention in which Relay Elements (RL1) and (RL2) (typically multi-Element Lenses) are present. Note that Relay Elements (RL1) and (RL2) in combination pass along Beams (BRR1) (BRR2), ideally without imposing additional influences on the Beam. That is, the Beam exiting (RL2) is substantially unchanged from that entering (RL1). (Note, alternatively any influence of (RL1) and (RL2) on a beam can be compensated for in a Regression based Calibration procedure). The benefit of this is demonstrated in FIG. 4 where a Collecting Element (L3) must be moved closer to Element (L2) to capture (BR1"), but a distance after Element (L3) then remains to be transversed. In the FIG. 5 embodiment this extra distance might not present an insurmountable problem, but in a FIG. 6 embodiment (which shows the Present Invention embodiment as in FIG. 5 but applied in a Chamber (C)) some means to direct the Beams (BRR1) and (BRR2) over the distance between Reflecting Element (PR2) and the Window (W2), and then provide it to a Sample Investigation ((BS)-(L5)-(D-DET)) and Positioning ((BS)-(L4)-(Z-DET)) systems is imposed by the geometry of said chamber (C). It is application of the Relay Elements (RL1) and (RL2) in the context of reflectometers, ellipsometers, spectrophotometers and the like systems that characterizes the Present Invention.

It is also noted that in FIG. 6 only passive optics are located inside Chamber (C), while generally all Source(S) and Detector (D-DET) and (Z-DET) are preferably located outside thereof.

Having hereby disclosed the subject matter of the present invention, it should be obvious that many modifications, substitutions and variations of the present invention are possible in view of the teachings. It is therefore to be understood that the invention may be practiced other than as specifically described, and should be limited only in its breadth and scope only by the Claims.

I claim:

1. A reflectometer, ellipsometer or spectrophotometer system comprising:
    a) a source of a beam of electromagnetic radiation;
    b) a first beam directing reflective element;
    c) a source beam focusing element;
    d) a stage for supporting a sample having a surface;
    e) a collimating element;
    f) a second beam directing reflective element;
    g) sequentially positioned first and second relay elements;
    h) a beam splitter;
    i) in a first path following said beam splitter a first detector focusing element and a sample surface position detector;
    j) in a second path following said beam splitter a second detector focusing element and a data detector; and
    k) a means for adjusting the position of a sample surface on said stage for supporting a sample;
said reflectometer, ellipsometer or spectrophotometer system being distinguished by the presence of said sequential first and second relay elements;
said reflectometer, ellipsometer or spectrophotometer system further comprising an environmental chamber with window regions through which electromagnetic radiation passes and in which said source of a beam of electromagnetic radiation and said beam splitter with associated detector focusing elements and sample surface position and data detectors are present outside thereof, with all other elements being present therewithin;
said first beam directing reflective element serving to direct the beam entered thereinto toward said sample surface at an oblique angle thereto.

2. A system as in claim 1 in which the:
    source beam focusing element;
    collimating element;
    first and second detector focusing elements in the pathways from said beam splitter;
are all lenses;
in which the first and second beam directing reflective elements are total internal reflection prisms; and
in which the sequentially positioned first and second relay elements are each multiple element lenses.

3. A method of aligning a sample surface on a stage for supporting it comprising the steps of:
    1) Providing a reflectometer, ellipsometer or spectrophotometer system comprising:
        a) a source of a beam of electromagnetic radiation;
        b) a first beam directing reflective element;
        c) a source beam focusing element;
        d) a stage for supporting the sample having the surface;
        e) a collimating element;
        f) a second beam directing reflective element;
        g) sequentially positioned first and second relay elements;
        h) a beam splitter;
        i) in a first path following said beam splitter a first detector focusing element and a sample surface position detector;
        j) in a second path following said beam splitter a second detector focusing element and a data detector; and
        k) a means for adjusting the position of a sample surface on said stage for supporting a sample;
    said first beam directing reflective element serving to direct the beam entered thereinto toward said sample surface at an oblique thereto;
    said reflectometer, ellipsometer or spectrophotometer system being distinguished by the presence of said sequential first and second relay elements;
    said reflectometer, ellipsometer or spectrophotometer system further comprising an environmental chamber with window regions through which electromagnetic radiation passes and in which said source of a beam of electromagnetic radiation and said beam splitter with associated detector focusing elements and sample surface position and data detectors are present outside thereof, with all other elements being present therewithin;
    2) Causing the sample having the surface to be present on said stage;
    3) calibrating the reflectometer, ellipsometer or spectrophotometer system by causing said source of a beam of electromagnetic radiation to direct a beam of electromagnetic radiation so that it is focused by said source beam focusing element onto said sample and reflects therefrom into said collimating element, said beam emerging therefrom, reflecting from said second beam directing reflecting element, passing through said sequentially positioned first and second relay elements and onto said beam splitter;

4) Adjusting the position of said stage so that a beam intensity received at the data detector is maximized or substantially so, and noting on said sample surface position detector an indication of that condition;

5) performing a selection from the group consisting of:
removing the sample having a surface from said stage for supporting said sample and placing it, or another sample thereupon; and
placing another sample having a surface upon said stage; and 6) Adjusting the position of said stage for supporting the sample so that the sample surface position detector indicates the same position as in step 4) and acquiring data from said data detector.

4. A method as in claim 3 in which the
source beam focusing element;
collimating element;
first and second detector focusing elements in the pathways from said beam splitter;
are all lenses;
in which the first and second beam directing reflective elements are total internal reflection prisms; and
in which the sequentially positioned first and second relay elements are each multiple element lenses.

5. A reflectometer, ellipsometer or spectrophotometer system comprising:
a) a source of a beam of electromagnetic radiation;
b) a source beam focusing element which directs the beam exiting therefrom toward a sample surface at an oblique angle thereto;
c) a stage for supporting said sample having said surface;
d) a collimating element;
e) sequentially positioned first and second relay elements;
f) a beam splitter;
g) in a first path following said beam splitter a first focusing element and a sample surface positioning detector;
h) in a second path following said beam splitter a second focusing element and a data detector; and
i) a means for adjusting the position of a sample surface on said stage for supporting a sample having a surface;
said reflectometer, ellipsometer or spectrophotometer system being distinguished by the presence of said sequential first and second relay elements, in functional combination with said beam exiting from said source beam focusing element being directed toward said sample surface at an oblique angle thereto.

6. A reflectometer, ellipsometer or spectrophotometer system as in claim 5, which further comprises two beam directing reflective elements, the first thereof being present between said source of a beam of electromagnetic radiation and said source beam focusing element, and the second thereof being present between said collimating element, and said sequential first and second relay elements.

7. A reflectometer, ellipsometer or spectrophotometer system as in claim 6, in which the beam directing reflective elements are total internal reflecting prisms.

8. A reflectometer, ellipsometer or spectrophotometer system as in claim 6 which further comprises an environmental chamber comprising window regions through which, in use, a beam of electromagnetic radiation from the source thereof enters and a beam exiting said two sequential relay elements exits.

9. A system as in claim 6 in which the two beam directing reflective elements are total internal reflection prisms and said first and second relay elements are of multiple element construction.

10. A system as in claim 5 in which the:
source beam focusing element;
collimating element;
first and second detector focusing elements in the pathways from said beam splitter;
are all lenses;
in which the first and second beam directing reflective elements are total internal reflection prisms; and
in which the sequentially positioned first and second relay elements are multiple element lenses.

11. A method of positioning a stage for supporting a sample in a reflectometer, ellipsometer or spectrophotometer system comprising the steps of:
1) Providing reflectometer, ellipsometer or spectrophotometer system comprising:
a) a source of a beam of electromagnetic radiation;
b) a source beam focusing element which directs the beam exiting therefrom toward a sample surface at an oblique angle thereto;
c) a stage for supporting the sample having the surface;
d) a collimating element;
e) sequentially positioned first and second relay elements;
f) a beam splitter;
g) in a first path following said beam splitter a first focusing element and a sample surface positioning detector;
h) in a second path following said beam splitter a second focusing element and a data detector; and
i) a means for adjusting the position of said stage for supporting a sample having a surface;

2) Causing the sample having the surface to be present on said stage for supporting the sample;

3) Calibrating the reflectometer, ellipsometer or spectrophotometer system by causing said source of a beam of electromagnetic radiation to direct a beam of electromagnetic radiation so that it is focused by said source beam focusing element onto said sample and reflects therefrom into said collimating element, said beam emerging therefrom, reflecting from said second beam directing reflecting element, passing through said sequentially positioned first and second relay elements and onto said beam splitter;

4) Adjusting the position of said stage so that a beam intensity received at the data detector is maximized or substantially so, and noting on said stage positioning detector an indication of that condition;

5) Performing a selection from the group consisting of:
removing the sample having a surface from said stage for supporting said sample and placing it, or another sample thereupon; and
placing another sample having a surface upon said stage; and 6) Adjusting the position of said stage for supporting the sample so that the sample surface position detector indicates the same position as in step 4) and acquiring data from said data detector.

12. A method as in claim 11 in which the:
source beam focusing element;
collimating element;
first and second detector focusing elements in the pathways from said beam splitter;
are all lenses;

in which the first and second beam directing reflective elements are total internal reflection prisms; and in which the sequentially positioned first and second relay elements are each multiple element lenses.

* * * * *